May 3, 1955 | A. KALIN | Re. 23,994

GOVERNORS

Original Filed Aug. 3, 1940

INVENTOR.
ALBERT KALIN

BY George W. Soule
ATT'Y.

United States Patent Office

Re. 23,994
Reissued May 3, 1955

23,994

GOVERNORS

Albert Kalin, deceased, late of Cleveland, Ohio, by Alvin L. Richards, Columbus, and Clarence C. Fowerbaugh, Lakewood, Ohio, administrators, assignors, by mesne assignments, to Alvin L. Richards and Clarence C. Fowerbaugh, Cleveland Ohio, as cotrustees Original No. 2,333,184, dated November 2, 1943, Serial No. 350,255, August 3, 1940. Application for reissue February 23, 1955, Serial No. 490,162

14 Claims. (Cl. 121—42)

Matter enclosed in heavy brackets [ ] appears in the original patent but forms no part of this reissue specification; matter printed in italics indicates the additions made by reissue.

This application and my application Serial No. 350,254, filed August 3, 1940, Patent 2,219,229 issued October 22, 1940, are companion applications relating to governors for regulating prime movers and other machines and apparatus. Reference is directed to the above identified patent for a more comprehensive discussion than given herein of problems relating to the making and operating of governors of the type herein shown.

The objects of the present invention are generally the same as those of the companion application. The objects include the improvement of *hydraulic* governor mechanisms in respect to [increasing] responsiveness *to detected error* (*as of speed*), [on part of the mechanisms to changes in conditions of the governed machines or apparatus requiring governing operations to be effected] and in respect to [securing greater] *attaining* simplicity [in governor] *of* construction together with greater accuracy of operation over long periods of time. [on part of the governors so constructed]

A specific object is to provide [certain modifications of the means] *an improved, fluid operated, compensation system on the order of that* shown in the companion application. [for securing primary and secondary compensation in governors and particularly isochronous governors]

Other objects of the invention will be brought out in connection with the following description of the illustrative embodiments shown herewith.

Figure 1:
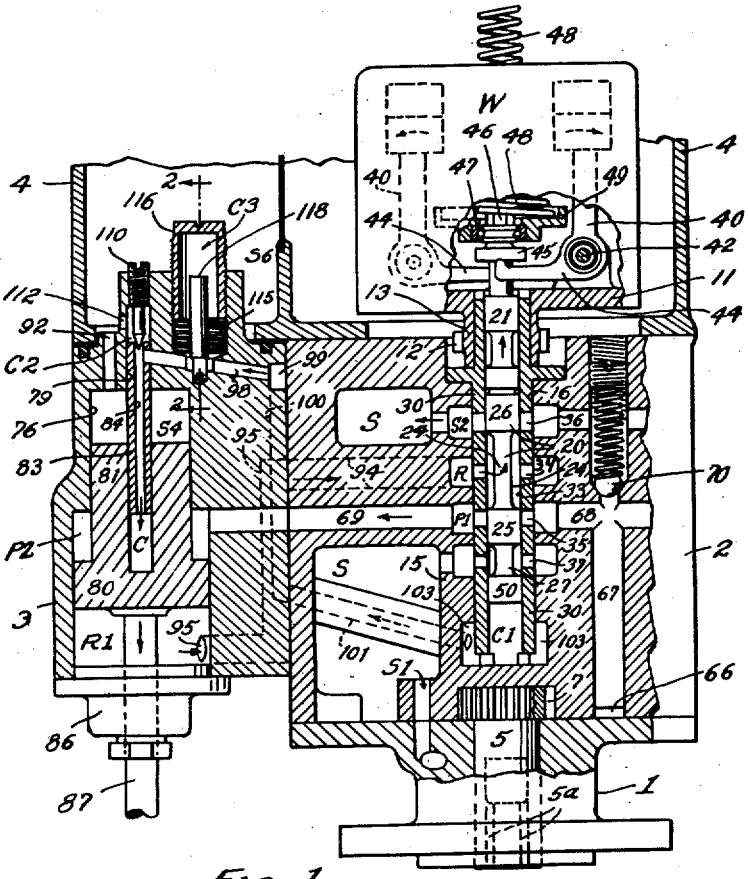
Figure 2:
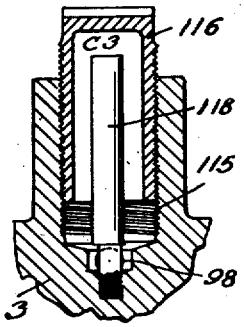
Figure 4:
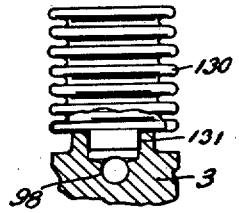
Figure 3:
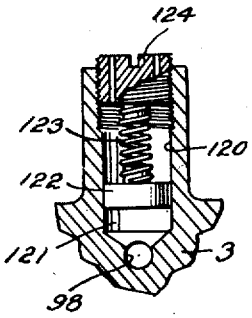
Figure 5:
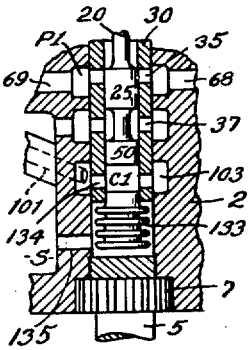
Figure 6:
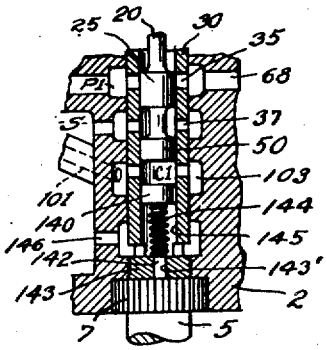

In the drawings, Fig. 1 is a vertical sectional view centrally cutting the main operating parts of the governor; Fig. 2 is a relatively enlarged detail vertical sectional view taken along the line 2—2 on Fig. 1; Figs. 3 and 4 are detail vertical sectional views showing modified constructions as though taken along the line 2—2 on a governor similar to that of Fig. 1; Fig. 5 is a detail view taken along a plane such as that of Fig. 1 and showing a modification similar to that of Fig. 4 but associated with the lower end of a pilot valve plunger and receiving compensation piston unit. Fig. 6 is a detail sectional view taken similarly to Fig. 5 showing still another modification. [Fig. 7 is a relatively enlarged sectional detail view taken in a plane similar to that of Fig. 1 in which a compensating fluid duct is further modified, and Fig. 8 is a general assembly vertical sectional view (mainly diagrammatical) showing still another modification.]

Governors of the type shown—adapted for speed regulation of prime movers and other machinery—have, as the *error detecting or* [primary] weighing *means* [element], a fly-ball mechanism such as shown at W, Fig. [s] 1 [and 8], rotatably mounted and connected with a rotary part of the machine to be governed. The condition of the fly-ball mechanism varies according to the speed of the rotary part. This variation can be utilized effectively through the agency of a hydraulic relay system including a single or double acting hydraulic servo-motor and a pilot valve connected with the fly-ball mechanism to control the flow of hydraulic fluid to and from the servo-motor, whereby to meter the rate of flow of energy medium to the prime mover. Such mechanism and relay together with compensating means acting as will be further explained below serves to maintain substantially constant speed of such prime mover notwithstanding variations in load imposed thereon. The pilot valve usually includes a valve plunger adapted to move axially in a co-operating valve part, for instance a sleeve with lateral ports.

The pilot valve plunger of the hydraulic relay, in present day isochronous governors arranged to operate as above outlined, is ordinarily maintained during the operation of the governor in a state of rotation relative to the coacting valve element, thereby to reduce static friction as more fully explained in *said patent* [the companion application], facilitating axial movement of the plunger when regulation-initiating impulses are imparted thereto by the weighing element. After the servo-motor starts its movement in the necessary direction to effect regulation of the governed machine it is necessary to check said movement in order to prevent over-correction. This is *commonly* done by primary compensating means which *operates through* [may operate on] the pilot valve plunger *on the flyball mechanism to reset speed* as a function of servo-motor movement [either to restrain]. *The primary compensating action in the specifically illustrated governor can be considered simply that of restraining* the axial movement of the pilot valve plunger. [or in some other manner to counteract its axial movement. Then, because] *Because* the weighing *means* [element], upon proper correction [being] *having been* effected, will eventually return to *equilibrium* [a predetermined position], another compensating action is necessary in order to prevent a permanent change in speed. This other compensating action, in isochronous governors, is referred to as secondary compensation. In governors having hydraulic power relays for regulation, primary and secondary compensation can be effected very simply by hydraulic means including, in effect a hydraulic *link* [lever] the operation of which is similar to a mechanical lever with a movable fulcrum such as well known in the art.

*In the present improvement, a piston which receives or is exposed to the necessary compensation fluid force action for transmission thereof to the speed weighing means is made, in operative effect, a part of the static-friction-free plunger member of the pilot valve, (so as also to be static-friction-free), and, in order that such piston will not adversely affect free pilot valve movement in response to speed error detection by the weighing means (through locking effect of hydraulic fluid in the generally closed system such hydraulic link as mentioned above must comprise), yieldable means are embodied in the hydraulic system so as to be operatingly and/or physically independent of the pilot valve mechanism. Thereby, in most of the herewith disclosed embodiments, the components of the yieldable means, in a hydraulic governor designed more or less along conventional lines, are or can be made readily accessible for adjustment and the like; and, in another embodiment, which includes a piston slidable in a cylinder (see Fig. 6) the mating surfaces of the piston and cylinder are relatively rotated continuously, hence are static-friction-free.* [The isochronous governor arrangements prior to the disclosures hereof and those of the companion application above identified were subject to static friction in the relative movement of parts necessary for effecting primary and secondary compensation. My arrangements are not; in other words the operations necessary for effecting primary and secondary compensation are not opposed by mechanical friction.]

Referring to Figs. 1 and 2, the main body parts of the governor may comprise a base or adapter 1 by which the governor is mounted, say on a prime mover to be governed; a power case 2 secured to the base; a servo-motor cylinder block 3 attached to the power case at one side thereof and a speeder case 4 surmounting the parts 2 and 3. The parts mentioned above are secured together by fluid tight joints so as to retain the hydraulic fluid.

A shaft 5 extends through the base and can be appropriately coupled with a turning part of the mechanism to be governed as by splines 5a inside the shaft. The upper end of the shaft 5 has a gear 7 thereon functioning as one element of a gear pump and an element of a gear train for driving the ball-head or weighing element W. Gear 12 on a sleeve portion 13 of a ball-head casting 11 is part of the gear train. The elements of the pump, gear drive, sump, etc. not shown herein are fully illustrated in my said Patent 2,219,229.

The ball-head assembly may comprise any suitable arrangement of centrifugally operated members such as weighted bell-cranks 40 pivoted as at 42 on the ball-head casting 11 and having ball-arm fingers 44, which are adapted to adjust the vertical position of a pilot valve plunger 20 which, as shown, operates inside a fixed valve sleeve 30 mounted in the power case in a bore 16 of a central tubular portion 15 of the latter. The sleeve 30 is appropriately fixed rigidly in place in the bore 16.

In the particular arrangement shown the pilot valve plunger turns with the ball-head whenever the latter is turned. The plunger may instead be held stationary while the valve sleeve is turned, for instance as illustrated in said patent, Fig. 6 thereof.

The ball-arm fingers 44 extend into contact with a ball-finger thrust member 45 which is secured to the upper reduced end of the pilot valve plunger as by means of a nut 46 which clamps an inner bearing race ring of a ball bearing 47 and the thrust member 45 against an upwardly facing shoulder on the valve plunger. The ball-arm fingers may have their inner ends seated in shallow downwardly facing depressions in the thrust member 45 as more fully shown and described in my said patent for the purpose of preventing the plunger from turning relative to the ball-head casting. A speeder spring 48 has its lower end bearing against a cupped spring seat collar 49 which contains the outer race ring of the bearing 47, the arrangement permitting the pilot valve to turn freely while the spring seat collar and speeder spring remain stationary. The force of the speeder spring may be adjusted by the usual means, not shown.

The pilot valve plunger 20 is designed to slide easily in the bore 33 of the sleeve 30 under impulses imparted by the fly-balls and speeder spring as is usual and well understood in the art. The plunger has lands 21, 25 and 26 all slidably fitting the bore 33. The lands 25 and 26 function as plugs to cover and uncover lateral ports 35 and 36 in the sleeve 30. A relatively long neck or reduced portion 24 of the plunger separates the lands 25 and 26 and the open space so afforded communicates with lateral openings 34 in the sleeve at all times. The plunger is illustrated in the position it assumes during the steady-state running condition of the governor, both sets of ports 35 and 36 being closed. A receiving or actuated compensation piston is shown at 50, slidably arranged in a cylindrical downward extension of the bore 33 of the sleeve 30. The receiving compensation piston of Fig. 1, which may be made as part of the valve plunger

20, could be the same for the modification of Figs. 3 to 6.[7] The neck 27 on the plunger which separates land 25 from the piston 50 affords a space between it and the adjacent wall of the sleeve 30 which is constantly vented to a low pressure area i. e. sump, as through lateral openings 37 in the sleeve. This effectually prevents pressure from above the land 25 from being communicated to the compensation duct, which latter terminates, at one end, at the lower face of the piston 50.

The hydraulic system, as partly described above, includes a sump provided in the space generally surrounding the portion 15 of the power case; and various chamber and duct portions of the apparatus which communicate freely with the sump are marked S, S1, S2, etc. The gear pump is supplied with hydraulic fluid from a main part of the sump as at S1. The pump, as shown in my said patent, discharges fluid past suitable check valves into the space marked P1 which is in open communication with a spring loaded accumulator (not shown) through ducts 66, 67 and 68.

A spring-pressed ball-check valve 70 may be used as the accumulator release, excess pressure fluid passing to the sump through a duct 72 past a space S2 surrounding the sleeve 30 at ports 36. The ports 36 and the lateral openings 37 between the valve plunger and the receiving compensation piston 50 are always in open communication with the sump.

The servo-motor cylinder block 3 is bored on three diameters from its lower end as at 75, 76 and 78. The bore 75 is the main power cylinder bore in which is slidably carried a power piston 80. The servo-motor, as shown, is double acting. A tubular upward extension 81 of the piston slidably closes the upper end of the power cylinder at the bore 76. The extension 81 of the piston is centrally bored from its top side as at 82 to form a primary or actuating compensation cylinder for an actuating compensation piston 83 which is fixed solidly in the bore 78 against a shoulder formed by a counterbore 79 upwardly beyond the bore 78. The actuating compensating piston is hollow for its full length at 84 to form part of a delivery duct for compensation fluid extending from the space marked C (as will be shown) to the lower end of the receiving compensation piston cylinder (space indicated C1 within the lower end of the sleeve 30). The lower end of the cylinder 75 is closed by a cap 86 fastened to the block, and the power cylinder piston 80 has a stem 87 extending through the cap, so that the piston can deliver power reciprocatingly to the control gate, throttle, injector, or other *metering* [regulating] element of the machine to be governed.

Hydraulic fluid travels from the constant pressure space P1 (around sleeve 30) to the upper part of the power cylinder 75 through a passage 69 formed partly in a bridge portion 90 of the power case 2 thus subjecting the top side of the piston 80 to constant pressure at all times.

Actuation of the piston 80 results, in part, from the release of fluid from the constant pressure system (from P1) through the space between the pilot valve lands 25 and 26 and surrounding space communicating therewith (marked R) to the lower side of the power piston portion 80 (space designated R1), when downward movement of the pilot valve opens the ports 35 in the sleeve 30. This, because of the difference in effective area between the upper and lower sides of the piston 80, moves the said piston upwardly as in order to increase speed of a prime mover governed by the mechanism. Downward movement of the power piston (slowing down of such prime mover) results from an upward movement of the pilot valve plunger and consequent release of "regulating" fluid from R1 and R, such movement of the pilot valve plunger opening ports 36 in the sleeve 30 and releasing regulating oil from R into the sump at S2. The cylinder space S4 above the piston extension 81 is open to a negligible pressure area through passage 92 leading into the speeder case 4 as indicated on Fig. 1.

Appropriate additional ducts for transfer of fluid between the pilot valve spaces mentioned and the power cylinder block spaces include a horizontal regulation fluid duct 94 leading from the space R to a duct 95 formed partly as a channel in the attaching face of the block 3, the lower end of which duct 95 opens into the space R1 below the piston 80. Compensation fluid discharged from the tubular actuating compensation piston 83 goes to a diagonally extending passage 98 in the upper end of the power cylinder block (partly in the wall of the tube 83 as shown), then to a cross channel 99 in the block 3, then down a vertical channel 100 to a bore 101 in another bridge portion of the power case, and finally to an enlarged cavity 103 surrounding the lower end of the valve sleeve 30 and communicating freely with the lower end of the receiving compensation piston cylinder (space C1).

An adjustable secondary compensation pressure-equalizing by-pass in the compensation fluid duct just described (between said duct and a negligible pressure area) is shown at C2, comprising a threaded needle valve pin 110 in an upper part of the block 3 and having a conical end projecting into the bore 84 of the piston 83, leaving a small gap between said conical end and the bore. Lateral openings 112 communicate with an enlarged space around the needle valve pin and permit free flow of fluid between the compensation fluid duct and a permanently maintained fluid reservoir space S6 in the speeder case.

*Freedom of movement of the pilot valve plunger 20 by the flyball mechanism W, without substantial restraint or fluid locking by the liquid column which, during normal operation, fills the compensation fluid duct, is enabled by the two-way-yielding means described below.* [Primary compensation, in the arrangement according to Figs. 1 to 7, is effected by providing for two way acting yieldability in the compensation duct, producing restraint on the pilot valve plunger movement as will now be described.] Referring first to Figs. 1 and 2:

Leading upwardly from a suitable portion of the compensation duct is a chamber C3 arranged to contain an elastic compressible medium (e. g. air or other gas, such as may be released from the hydraulic fluid) which medium *can be considered as operating* [operates] through the fluid in the compensation duct: (a) to oppose or place restraint on the upward movement of the pilot valve plunger 20 , *via its* [acting on the] receiving compensation piston 50 [)] when the fly-ball mechanism lifts the plunger; and (b) to oppose or place restraint on the downward movement of the plunger when the fly-ball mechanism lowers the plunger. When the pilot valve plunger moves upwardly this initiates downward movement of the servo-motor which, in turn, reduces pressure below normal in the compensation fluid duct; and, because of the elastic [expansible] nature of the fluid in the upper part of the chamber C3, the effect of the reduced pressure is to draw downwardly yieldably on the lower face of the receiving compensation piston 50 (function a). Similarly, compression of the elastic fluid in C3 results in upward yielding force being transmitted to the valve plunger when the servo-motor piston is raised (function b). The chamber C3 can be made adjustable to vary the elastic fluid content thereof. The lower part of the chamber as shown is formed by a threaded hole 115 in the block 3 communicating with the compensation duct portion 98, and the upper part by an inverted cup member 116 closed at the top and peripherally threaded so as nicely to fit the threads of the hole 115, sealing the chamber at the threads partly through the agency of the hydraulic operating fluid maintained in the reservoir S6. Part of the chamber may be occupied by a fixed post 118 which extends upwardly from the block 3 well above the level at which hydraulic compensation fluid is maintained in the chamber. Said level would ordinarily be maintained about even with the lower rim of the cap member, since if more than just sufficient air or gas tends to occupy the chamber than can be contained by the cap at normal pressure it will eventually escape by way of the threaded connection between the cap and hole 115. In any event (for instance should the adjustment feature be omitted) the excess air or gas will eventually leave the chamber by way of the duct portion 98 and the adjustable secondary compensation bleeder C2.

Operation.—Assuming that the shaft 5 is connected to a prime mover running at constant speed (normal, as determined by speed setting through the speeder spring 48) the fly-ball mechanism maintains the pilot valve plunger centered so long as that condition obtains (steady state). If a certain percentage of the load on the prime mover is dissipated, then the speed increases proportionately, and the pilot valve plunger will be raised by outward movement of the fly-ball weights, thus opening the ports 36 and permitting the discharge of regulation fluid from R to the sump. Arrows, *in Fig. 1,* [on the parts] indicate the direction of movement of the parts and hydraulic fluid in case of decrease in load and resulting increase in speed. Constant *fluid* pressure at P2 then lowers the power piston of the servo-motor, reducing the prime mover speed through the stem 87 and connected mechanism. Eventually this action of the servo-motor would be checked by return movement of the fly-balls toward original position referred to as the prime mover slows down, thus closing the ports 36; but by that time the governed machine would be running at under speed or below normal. As soon as the piston 80 starts downwardly, compensation fluid , *moving in the indicated direction, tends* [is drawn from C1 into C, thus tending] to evacuate the chamber C3 and *places* [placing] resilient restraint on the upward movement of the valve plunger at the receiving compensating piston portion 50 thereof. A negligible volume of hydraulic fluid moves inwardly through the secondary compensation by-pass *or leak orifice* C2 during this action. The restraining action (primary compensation) on the plunger, although exerting only a small percentage of the force exerted thereon by the [speeded] fly-balls, *temporarily adds to the effective* [augments the] force of the speeder spring 48 *stabilizing prime mover speed at a new value as usual in governing.* [the necessary amount to cause the fly balls to return sufficiently quickly to a position closing the ports 36 so that an under-speed condition of the prime mover does not take place.] By reason of the elasticity of the pocketed air or gas in the chamber C3, or equivalent elastic means hereinafter described, the column of hydraulic fluid in the compensation fluid duct 98—101 is also elastic in its effect on the receiving compensation piston 50, and, consequently the valve plunger is free to move in response to very slight speed changes imposed on the fly-ball mechanism. [As the prime mover, under the correcting influence of the servo-motor, returns toward normal speed, it is necessary to remove the restraining influence of the vacuum in the chamber C3 on the piston 50 and the valve plunger in unison with the return to normal speed on part of the prime mover, for otherwise a reverse action of the pilot valve would take place, at least temporarily, such as when speed acceleration is needed. In other words isochronous governing would not be accomplished.] Secondary compensation, necessary for isochronous governing, is accomplished by *adjusted leakage of* [by-passing] fluid from the sump reservoir S6 into the compensation duct thus gradually relieving the suction force generated by the partial vacuum in the chamber C3. The gas in C3, in returning to normal pressure, finally establishes a neutral or non-acting pressure condition in the compensation duct. The leakage through the secondary compensation by-pass C2 is regulated in accordance with the ability of the governed machine to respond to corrective impulses by the servo-motor; and once the needle valve 110 has been adjusted to suit the machine on which the governor is installed or with which connected, it needs no further attention.

When load on the prime mover is increased over normal and its speed thereby decreases, the action of the governor is the reverse of that just described. The pilot valve plunger is then *moved downwardly* [pressed down] by the speeder spring as the fly-ball weights move inwardly. This opens the ports 35 to the interior of the sleeve 30 and subjects the lower side of the piston 80 to sufficient pressure to lift it, the fluid moving from P1 through ports 35 and 34, space R, ducts 94, etc. to R1. The actuating compensation piston 83 then pumps fluid into the compensation duct, compressing the air or gas trapped in the chamber C3 thus elastically pressing upwardly on the receiving compensation piston 50 and the pilot valve plunger, restraining the downward movement of the latter and *decreasing* [tending to decrease] the effective force of the speeder spring 48 in opposing outward movement of the fly-balls. As the pilot valve plunger returns to normal position upon initiating the speed-corrective cycle, the compressed air or gas expands to unstressed condition, forcing fluid from the compensation duct at the by-pass C2 and ports 112. Were it not for the yield in the compensation duct provided, as by the gas pocket in the space C3, the pilot valve plunger would be locked against being moved quickly either downwardly or upwardly by the fly-balls in response to speed change. Therefore the governor would not respond to a change in speed until fluid had leaked in or out at the by-pass C2.

By reason of the constant relative rotation maintained between both the pilot valve plunger and receiving compensating piston and their guide bores during the entire operation of the governor, it will be seen that said plunger and piston are always in readiness to be moved axially. with no possibility of sticking due to accumulation of foreign matter (as from the oil) in the microscopically small clearance spaces between the sliding guides; and, by reason, of the elasticity in the compensation fluid duct the valve plunger cannot become oil locked by hydraulic fluid in said duct. Immediate responsive operation of the governor to influences calling for changes in a condition of the governed machine or mechanism is thus assured.

The [primary] weighing *elements* [element] can be made responsive to any force factors other than speed, for instance, fluid or current pressure or flow, gravity, etc.

Referring to Fig. 3, this illustrates another means of effecting primary compensation by restraining the valving movement of the pilot valve through the agency of the hydraulic coupling between the servo-motor and the receiving compensation piston 50. As shown a cylinder 120 is connected at one end, as at 121, with the compensation duct, as at the portion 98 thereof. Slidable in the cylinder is a piston 122 which is normally held as in the position shown by a spring 123 connected at one end to the piston and at the other to a fixed part such as a threaded block 124 in the outer end of the bore which forms the cylinder. The outer end of the cylinder, as shown, is vented through the block as at 125. The spring 123, during steady state conditions of the governed machine or apparatus, is in a neutral or non-stressed condition. When the pilot valve plunger is moved downwardly the *servo-motor then acts through its fluid forcing means to raise the pressure in the compensation fluid duct, and the fluid* [receiving compensation piston acting through the column of fluid in the compensation duct], compresses the spring 123 and when the *opposite action occurs* [plunger moves upwardly] the spring 123 is stretched. The restraint placed on the pilot valve plunger is removed *as* [when] normal pressure is reestablished in the compensation fluid duct by *leakage through* the adjustable bleeder, at C2.

The arrangement of Fig. 4 is in a sense a combination of the Fig. 2 and Fig. 3 devices. An upstanding bellows 130 with resilient wall portions is in sealed relation to the compensation fluid duct as at 131. The longitudinal resiliency of the bellows, yieldingly resisting axial collapse and expansion of its corrugated side wall, acts to augment the resistance to contraction and expansion of the pocket of air or gas trapped in the upper portion of the bellows. The operation will be *understood* [obvious] from the preceding description.

Fig. 5 shows a bellows 133 similar to that of Fig. 4 [is] connected at its open end to the compensation fluid duct and in inverted position relative to the bellows of Fig. 4. The bellows 133 can be secured for instance at the lower end of the sleeve 30 in a general arrangement which is modified to afford room below the sleeve in which the bellows 133 may operate. The compensation *fluid* duct portion 101 communicates with the receiving compensation cylinder as before, but through a wall of the sleeve 30 (see openings 134) above the lower end of the sleeve 30. No air or gas will be trapped in the bellows of Fig. 5 but the yielding resistance to longitudinal expansion and contraction on part of the belows 133 *enables free movement of the pilot valve plunger etc.* [causes the latter to effect primary compensation—acting through the hydraulic fluid medium on the receiving compensation piston 50] in a manner similarly to the action of the device of Fig. 3. The space surrounding the bellows 133 is vented as to the sump at 135.

Fig. 6 shows an adaptation of the arrangement of Fig. 3 but in which the spring-positioned piston (corresponding to piston 122 of Fig. 3) is turned relative to its cylinder at all times, whereby to eliminate any possibility of the piston "sticking" i. e. refusing to move axially during regulation operations of the governor. As shown the piston 140 operates in the lower end of the *valve*-sleeve 30, beyond the point of communication of the compensation fluid duct portion 101 therewith. A stub shaft 142 extends upwardly from the gear supporting portion of the shaft 5 through a close fitting hole 143' in a plug 143 which lies above the gear 7 and separates the pump chamber from the *sump-connected space 145 (vent at 146) in* [space at] the lower end of the sleeve 30. The piston 140 and shaft 142 are connected by a coil spring 144, shown with its ends threaded onto the shaft and piston respectively. [The cylinder space 145 below the piston 140 is vented to the sump as at 146.] Normally the spring 144 is unstressed axially. The device except for the relative rotation of the piston 140 and its cylinder wall is essentially the equivalent of the Fig. 5 arrangement.

[Fig. 7 illustrates an arrangement that could be used instead of the compensation fluid retaining but elastically resisted primary compensation devices of Figs. 1 to 6. This comprises a pair of oppositely acting spring closed check valves associated with the hydraulic coupling (e. g.) between the actuating compensation piston 83 and the receiving compensation piston 50. The device can be incorporated in one of the compensation fluid duct portions which are formed between the adjacent faces of the power case 2 and power cylinder block 3, as in the duct portion 100. As shown a valve disc 150 is seated by a spring 151 over a plate 152 with apertures 153 leading from the duct 100 to the sump past the valve disc. A reversely acting valve disc 155 is seated by a spring 156 against the end face of an enlarged lateral extension 157 of the compensation fluid duct 100. Said end face is apertured as at 158 and the apertures communicate suitably with the sump as through a duct 159. The springs 151 and 156 exert equal force on their respective discs.]

[In operation (Fig. 7) the spring pressed discs open to allow the passage of fluid into and out of the compensation fluid duct so that the weighing-element-actuated movement of the pilot valve plunger is resisted by the pumping action of the actuating compensation piston and cylinder couple 81—83, but the resistance is limited at all times by the force of the springs 151 or 156 (whichever is rendered active, as determined by the direction of relative movement of the elements of said couple 81—83).

The device permits by-pass of fluid into or out of the compensation duct as required in order to permit the weighing element to act quickly on the pilot valve plunger in the event of a quick load change. Irrespective of the direction of movement of the actuating compensation piston and cylinder by the servo-motor said actuating piston and cylinder maintains a restraining force on the pilot valve plunger limited by the loading of the springs. The restraint to pilot valve movement originating from fly-balls is likewise limited by the loading of the springs.]

[A flexible chamber (as in Fig. 5 for instance), or an equivalent thereof, may be used with the device of Fig. 7 in order to maintain elasticity as to fluid in the compensation duct at all times. In such case the spring pressed discs would simply limit the elastic force irrespective of how much fluid is pumped by the actuating compensation piston.]

[Referring to Fig. 8 this illustrates an arrangement in which a dash-pot, the elements of which are maintained constantly in a state of relative rotation, is caused to exert compensating influence on the pilot valve of a hydraulic relay in response to regulating operations on part of the servo-motor of the relay. Secondary compensation is ac complished by an adjustable leak-off associated with the dash-pot.]

[The hydraulic relay is the same in principle as that of Fig. 1 hence it will not be described in detail. The parts corresponding to those of Fig. 1 are numbered similarly. For convenience the servo-motor is shown in inverted position relative to the servo-motor of Fig. 1.]

[The servo-motor piston 80 operates in a downward direction to increase speed (assuming connection with a prime mover) whenever the weighing element W, as by inward movement of the fly-balls, allows the speeder spring to depress the plunger 20. Reverse movements of the parts and fluid (those movements indicated by the arrows) occur upon outward movement of the fly-balls. An actuating part 48', for speed adjustment, is shown bearing downwardly on the upper end of the speeder spring 48. The speeder spring and the adjusting part are made large enough to accommodate the dash pot and actuating arrangement therefor. The dash-pot, as shown, is a cylinder-forming cup 160 attached as at 161 to the upper reduced end of the pilot valve plunger and serving in place of the nut 46 of Fig. 1 as to the bearing assembly. The cup cylinder 160 thus rotates with the pilot valve plunger.]

[A piston 163 in the dash-pot cylinder is held normally in a position such as that shown by a spring 164 fixedly connected at its upper end with an adjusting lever 165 which latter has a fixed pivot at 166. The left hand end of the lever is connected to a link or rod 167 and the lower end of the link or rod is connected with the servo-motor piston 80. The adjustable leakoff may be a threaded needle valve 168 on the dash-pot piston.]

[When the valve plunger is depressed by the speeder spring (fly-balls moving inwardly) the resulting downward movement of the servo-motor piston acts through the link and lever to stretch the spring 164 which then, through the piston 163 tends to evacuate the dash-pot cylinder space below the piston. This restrains the downward movement of the pilot valve plunger and, finally, the restraining influence is removed by the secondary compensation leak-off device 168.]

[A reverse action takes place (that indicated by the arrows) when the valve plunger 20 is raised by the overspeeded fly-balls, and in such event the fluid medium in the lower part of the dash-pot is subjected to positive pressure by the compression of the spring 164 incident to upward movement of the servo-motor piston.]

What is claimed is:

1. A governor having a primary weighing element connected to a pilot valve plunger which is reciprocably mounted relative to a co-operating pilot valve element whereby the weighing element and plunger can initiate regulation of a governed mechanism by controlling the flow of a hydraulic medium in respect to a servo-motor, and wherein the plunger and its co-operating valve element have circular valving surface contact, means to maintain the plunger and its co-operating valve element in relative unidirectional rotation during the entire operation of the governor, hydraulically acting compensation means including an actuating compensation displacement unit operated by the servo-motor, and a receiving compensation piston/cylinder unit one element of which is fixed relative to the plunger and the other element of which is in fixed relation to said co-operating valve element so that the elements of the receiving compensation piston/cylinder unit likewise turn unidirectionally relative to each other during the entire operation of the governor, and an elastically expansible and contractable duct hydraulically coupling the actuating and receiving compensation units together in a manner yieldably to restrain longitudinal movement imparted to the valve plunger by the weighing element.

2. A governor wherein a rotary weighing element acts through a pilot valve plunger which is rotated continuously and unidirectionally in a co-operating valve sleeve by the weighing element and is moved axially by said element to initiate regulating impulses of a servo-motor, an actuating compensation displacement means operatively connected to the servo-motor, a compensation fluid duct in which hydraulic fluid is moved by the displacement means, one end of the plunger and the valve sleeve constituting a receiving compensation piston/cylinder and one end of said fluid duct, and means co-operating with hydraulic fluid in said duct to render the same, in effect, elastic so as yieldably to restrain the pilot valve plunger.

3. In a governor of the type which acts to effect regulation hydraulically through a servo-motor, valve means to control the servo-motor, and a weighing element controlling the valve means, compensation means including a hydraulic coupling including a duct for hydraulic fluid between the servo-motor and valve means so arranged that regulating movement of the servo-motor initiates compensating movement of hydraulic fluid in the duct, means to impart motion of the hydraulic fluid to the valve means, and means forming a retaining chamber for expansible and contractable fluid, said chamber constituting part of the duct and operable to render the hydraulic fluid elastic in effect for resiliently biasing the valve means.

4. In a governor according to claim 3, the arrangement wherein said chamber has adjusting means to vary its normal content.

5. In a governor according to claim 3 the arrangement wherein said chamber has a displacement member extending thereinto and a cup forms part of the chamber and is adjustable toward and away from the displacement member to vary the effective size of the chamber.

6. The arrangement according to claim 3 wherein the retaining chamber forming means has a resilient wall capable of being expanded and contracted by action of the hydraulic fluid on the contained expansible and contractible fluid.

7. In a governor of the type which acts to effect regulation hydraulically through a servo-motor, valve means to control the servo-motor, and a weighing element controlling the valve means, compensation means including a hydraulic coupling including a duct for hydraulic fluid between the servo-motor and valve means so arranged that regulating movement of the servo-motor initiates compensating movement of hydraulic fluid in the duct, and a bellows having a resilient wall, said bellows constituting part of the duct and extending downwardly so that only the resilient wall is effective to lend elasticity to the duct.

8. In a governor of the type which acts to effect regulation hydraulically through a servo-motor, valve means to control the servo-motor, and a weighing element controlling the valve means, compensation means including a hydraulic coupling including a duct for hydraulic fluid between the servo-motor and valve means so arranged that regulating movement of the servo-motor initiates compensating movement of hydraulic fluid in the duct, said duct having a fixed cylinder portion forming a branch thereof, a piston in the cylinder, and spring means normally holding the piston in a predetermined position with respect to the cylinder.

9. In a governor of the type which acts to effect regulation hydraulically through a servo-motor, valve means to control the servo-motor, and a weighing element controlling the valve means, compensation means comprising a displacement element operated by the servo-motor and *hydraulic* [hyqdraulic] fluid duct connecting the displacement means with a piston-constituting portion of the valve whereby to bias the valve incident to servo-motor movement by varying the pressure in the duct, said duct having a portion constituted by a piston and cylinder, spring means normally holding the piston and cylinder against axial relative movement, and means to maintain constant relative rotation between the piston and cylinder.

10. An isochronous governor for prime movers subject to varying loads, comprising: a shaft adapted to be rotated by the prime mover, speed-responsive means driven by said shaft, a prime-mover-regulating servo-motor, means for supplying hydraulic fluid under pressure to said servo-motor, a plunger-type pilot valve assembly controlling said supply of hydraulic fluid to said servo-motor in accordance with prime mover speed, the pilot valve comprising two telescopingly-related members having cylindrical surfaces in mating contact continuously unidirectionally relatively rotated by said shaft, primary compensation means for biasing said pilot valve against axial movements imparted thereto by said speed-responsive means, said pilot-valve biasing means comprising a second fluid-pressure system independent of said source of servo-motor-actuating fluid pressure, means for varying the pressure in said second system comprising a displacement element actuated by servo-motor movement, a cylindrical piston-constituting element *operatingly rigid with* [on] the axially movable or plunger member of said pilot valve assembly in mating contact with a cylindrical surface of the other member and correspondingly continuously unidirectionally relatively rotated with respect to the contacting surface and elastically yieldable reversibly acting means operatively associated with said second fluid pressure system in a manner to effect temporary retention of biasing force on the pilot valve after regulating movement of the servo-motor has been effected, and secondary compensation means comprising a metering leak element in said second fluid-pressure system for dissipating said biasing force.

11. In a governor mechanism a hydraulic relay including a regulating servo-motor and a pilot valve arranged to initiate regulating movements of the servo-motor in response to predetermined change of a condition to be governed, said pilot valve comprising a cylindrical plunger member and complementary valving member, means for causing continuous unidirectional relative rotation between the valve members, one end of the valve plunger and an adjacent portion of the complementary member constituting a piston/cylinder unit with mating cylindrical elements also unidirectionally relatively rotated by said means, hydraulic fluid displacement means operatively connected with the servo-motor and hydraulically with the cylinder of said unit in a manner to cause regulating movements of the servo-motor to act on the piston of said unit to restrain axial movement of the valve plunger, and means operatively in two-way-acting yielding contact with hydraulic fluid between the displacement means and the piston of said unit to render the displaced hydraulic fluid elastic in its effect on said piston irrespective of the direction of movement of the servo-motor.

12. Governor mechanism according to claim 11 wherein said complementary valving member is a sleeve into which the plunger is insertable at one end of the sleeve, said sleeve having an inner bore portion for *receiving* [engagement with] the piston-constituting portion of the valve plunger, said bore portion being no larger than the valving portion of the sleeve whereby the piston and plunger can be inserted in and removed from the sleeve as a unit at said end of the sleeve.

*13. In a hydraulic governor for engines, a fluid operated servo-motor adapted to meter an energy medium to the engine, a pilot valve having two co-operating valve elements, the pilot valve being connected to control the servomotor through relatively opposite valving movements of one of said valve elements, speed weighing means connected to said one valve element to actuate the pilot valve, a hydraulic compensation system comprising fluid forcing means connected for operation by the servomotor whenever servomotor operation takes place, a receiving compensation fluid displacement element connected to said one valve element for concurrent movement therewith and compensating action therethrough, means forming a generally closed liquid filled passage connecting the fluid forcing means with said displacement element, a leak orifice communicating with the passage, means forming a cylinder bore in communication with said passage, a piston slidable in said bore, and compensation-fluid-force-storing spring means connected to the piston in a manner normally to hold the piston in a predetermined position axially of the bore.*

*14. In a governor of the type which acts to effect regulation hydraulically through a servo-motor, valve means fluid-connected to control the servo-motor, the valve means comprising an axially movable plunger and a cooperating valve sleeve, a speed weighing element connected to the plunger for initiating operation of the valve means, a compensation fluid system comprising a hydraulic fluid forcing means connected for operation by the servo-motor, a generally closed duct between the fluid forcing means and a bore portion of the valve sleeve, the valve plunger having a piston portion slidable in the sleeve bore portion and thereby subjected to pressure variations of hydraulic fluid in the duct to produce primary compensating action through the intermediary of the valve plunger, a cylinder remotely of the valve sleeve, the bore of the cylinder being connected to the duct, a piston slidable in the cylinder bore, compensation force storing, two-way-acting, spring means connected to the piston in a manner normally to hold the piston in a predetermined position in said bore and compensation-force-dissipating leak means connected with the duct.*

References Cited in the file of this patent or the original patent

UNITED STATES PATENTS 1,918,424 Pontow et al. ---------- July 18, 1933